United States Patent Office 2,751,423
Patented June 19, 1956

2,751,423

DISPROPORTIONATION REACTIONS WITH ALUMINUM CHLORIDE

William K. Conn., Springfield, Pa., assignor to Sun Oil Company, Philadelphia, Pa., a corporation of New Jersey No Drawing. Application December 23, 1952, Serial No. 327,657

9 Claims. (Cl. 260—676)

This invention relates to the conversion of propane by reaction with higher boiling isoparaffins to form intermediate boiling hydrocarbons.

Although propane has special uses such as in solvent refining, a commercially feasible process for converting propane to more valuable higher molecular weight hydrocarbons has long been desired. Processes for converting propane to higher molecular weight isoparaffins which are valuable as gasoline components or for further reaction to form valuable hydrocarbons have heretofore been described. Such processes, however, have not been successful because the relative inertness of propane has heretofore required use of the strong corrosive catalytic combination of hydrogen fluoride and boron trifluoride. The use of this catalytic combination, especially the hydrogen fluoride, requires special equipment for storage, handling and use, and constitutes a safety hazard. Furthermore, the yields of isoparaffins from propane conversion have been too small to warrant commercial operation.

An object of the present invention is to provide a process for converting propane into higher molecular weight branched chain hydrocarbons which are useful as such, or which may be further reacted to produce valuable hydrocarbons. A further object is to provide a commercially feasible process for simultaneously converting propane to isoparaffins by reaction of the propane with higher molecular weight insoparaffins in an averaging process. Other objects will be apparent from the following specification.

It has now been discovered that by contacting a mixture of propane and a paraffin having at least 5 carbon atoms per molecule with aluminum chloride under the temperature and pressure conditions described hereinafter, the propane is converted in substantial yields to valuable isoparaffins, and the paraffin reactant having at least 5 carbon atoms is converted to lower molecular weight valuable isoparaffins.

The propane reactant may be obtained from any source, such as natural gas or from any refinery operation yielding a gas having a high concentration of propane. Other materials, such as ethane and methane, do not react in the process and such materials serve merely as diluents. The propane may also be used in admixture with isobutane, and the isobutane subsequently removed with the additional isobutane formed in the reaction. Butane may also be present in the reaction mixture and is largely converted to isobutane by isomerization and is recovered as such together with the isobutane formed in the reaction. Small amounts of olefins, less than about 2%, do not deleteriously affect the process. Preferably the propane concentration in an admixture of lower hydrocarbons for use in the process should contain a concentration of at least 50% propane.

The higher paraffin reactant must have at least 5 carbon atoms per molecule. Preferably the paraffin reactant has at least one tertiary hydrogen atom per molecule since such paraffins give, in the present process, a relatively fast cleancut reaction. By "tertiary hydrogen atom" is meant a hydrogen atom which is attached to a tertiary carbon atom. Isopentane, 2-methylpentane, 3-methylpentane, 2,2,4-trimethylpentane, and the hexane, heptane and octane homologues thereof give good results. Kerosene petroleum fractions containing a high proportion of isoparaffins give good results, since the isoparaffins therein are converted to low boiling isoparaffins within the gasoline range. Preferably, the kerosene fraction should contain at least about 50% isoparaffins having a tertiary hydrogen atom to give good results.

In the process, it is preferred to employ a mole ratio of propane to the higher paraffin reactant of at least 1:1, and preferably a mole ratio in the range of from 1:1 to 10:1. The quantity of catalyst, aluminum chloride, to employ will usually be within the range of from about 2 to 100 weight per cent, and preferably 5 to 50 weight per cent, based on the quantity of hydrocarbon reactants.

The temperature to employ must be within the range of from 50° C. to 200° C., and preferably is within the range of from 90° C. to 150° C. At lower temperatures the time of reaction becomes prohibitively long, whereas at higher temperatures substantial cracking of the reactants or products or both is observed. The present process is carried out in the liquid phase and the pressure should be sufficient to maintain the propane reactant in the liquid phase. Within the temperature range employed, the pressure will generally be from 200 to 2000 p. s. i. g. Under the described conditions of operation the time of reaction usually will require from about 0.25 to 4 hours, but shorter or longer reaction times may be employed if desired.

The following examples illustrate the process of the present invention in which "parts" refers to parts by weight, unless otherwise indicated.

Into a reactor containing 10.4 parts aluminum chloride were introduced 100 parts propane, 74.4 parts isooctane, and 59 parts isobutane. The reaction mixture was agitated at 100° C. for two hours, the pressure being sufficient to maintain the components in the liquid phase. The catalyst was separated from the reaction mixture and there were recovered 173 parts of propane and isobutane consisting of a mixture of unreacted propane, the isobutane initially present, and the isobutane formed in the reaction. The quantity of isobutane was increased at least 25% with a substantially corresponding decrease in the concentration of propane. There were also recovered 20.8 parts isopentane, 8.3 parts hexane, 6.25 parts heptane, 19.4 parts octanes consisting principally of unreacted isooctane, and a small amount, about 7.6 parts, of higher boiling hydrocarbons.

The foregoing procedure was substantially duplicated by agitating together, at 100° C., for two hours in the liquid phase, 12.3 parts aluminum chloride, 100 parts propane, 59 parts isopentane and 69 parts isobutane. After separation of the catalyst there were recovered 184 parts of a mixture of propane and isobutane consisting of unreacted propane, the isobutane initially present and the isobutane formed in the reaction, the total quantity of isobutane being increased by about 25%. There were also recovered 32.8 parts unreacted isopentane, 6.55 parts of hexanes and a small amount, about 1.6 parts, of higher boiling hydrocarbons.

The foregoing examples illustrate the reaction of propane with isoparaffins having at least 5 carbon atoms and one tertiary hydrogen atom per molecule to form intermediate boiling hydrocarbons of much greater value than propane. It will be apparent to those skilled in the art that batch or continuous operation may be employed.

If desired, a small amount of an activator, such as hydrogen chloride, may be added to the reaction mixture, usually less than about 10% by weight based on the quantity of aluminum chloride employed, in which event relatively low temperatures within the range above described are advantageously employed. It is essential in the process of the present invention that the paraffin reacting with propane have at least 5 carbon atoms, and preferably the paraffin has at least one tertiary hydrogen atom per molecule. For example, if propane and isobutane be admixed together with aluminum chloride within the temperature and pressure ranges of the present process, no reaction is observed. The presence of aromatic hydrocarbons is undesirable, and such hydrocarbons should not be present in amounts greater than about 1% of the hydrocarbon reactants.

The invention claimed is:

1. Process for the conversion of propane which comprises reacting, in liquid phase, propane with an isoparaffin having at least 5 carbon atoms and one tertiary hydrogen atom per molecule in the presence of aluminum chloride at a temperature of from 50° C. to 200° C., the mole ratio of propane to said isoparaffin being at least 1:1, to produce isoparaffins boiling intermediate said propane and said isoparaffin having at least 5 carbon atoms and one tertiary hydrogen atom per molecule.

2. Process according to claim 1 wherein said isoparaffin having at least 5 carbon atoms and one tertiary hydrogen atom per molecule is isopentane.

3. Process according to claim 1 wherein said isoparaffin having at least 5 carbon atoms and one tertiary hydrogen atom per molecule is a hexane.

4. Process according to claim 1 wherein said isoparaffin having at least 5 carbon atoms and one tertiary hydrogen atom per molecule is 2-methylpentane.

5. Process according to claim 1 wherein said isoparaffin having at least 5 carbon atoms and one tertiary hydrogen atom per molecule is a heptane.

6. Process according to claim 1 wherein said isoparaffin having at least 5 carbon atoms and one tertiary hydrogen atom per molecule is 2-methylhexane.

7. Process according to claim 1 wherein said isoparaffin having at least 5 carbon atoms and one tertiary hydrogen atom per molecule is an octane.

8. Process according to claim 1 wherein said isoparaffin having at least 5 carbon atoms and one tertiary hydrogen atom per molecule is 2,2,4-trimethylpentane.

9. Process according to claim 1 wherein said isoparaffin having at least 5 carbon atoms and one tertiary hydrogen atom per molecule is a kerosene fraction.

References Cited in the file of this patent

UNITED STATES PATENTS

| | | |
|---|---|---|
| 2,270,669 | De Simo et al. | Jan. 20, 1942 |
| 2,385,344 | Burk | Sept. 25, 1945 |
| 2,417,187 | Callaway | Mar. 11, 1947 |